(12) United States Patent
Haustein et al.

(10) Patent No.: US 8,390,518 B2
(45) Date of Patent: Mar. 5, 2013

(54) ADAPTIVE ADJUSTMENT OF AN ANTENNA ARRANGEMENT FOR EXPLOITING POLARIZATION AND/OR BEAMFORMING SEPARATION

(75) Inventors: Thomas Haustein, Potsdam (DE); Egon Schulz, München (DE); Wolfgang Zirwas, München (DE)

(73) Assignee: Nokia Siemens Networks Oy, Espoo (FI)

( * ) Notice: Subject to any disclaimer, the term of this patent is extended or adjusted under 35 U.S.C. 154(b) by 344 days.

(21) Appl. No.: 12/676,371

(22) PCT Filed: Aug. 27, 2008

(86) PCT No.: PCT/EP2008/061225
§ 371 (c)(1),
(2), (4) Date: Jun. 14, 2010

(87) PCT Pub. No.: WO2009/030617
PCT Pub. Date: Mar. 12, 2009

(65) Prior Publication Data
US 2010/0277394 A1 Nov. 4, 2010

(30) Foreign Application Priority Data
Sep. 5, 2007 (EP) .................................... 07017417

(51) Int. Cl.
*H01Q 1/38* (2006.01)
*H01Q 21/00* (2006.01)
*H01Q 3/24* (2006.01)

(52) U.S. Cl. ................. 343/700 MS; 343/702; 343/876; 343/853

(58) Field of Classification Search .................. 343/702, 343/700 MS, 876, 793, 853
See application file for complete search history.

(56) References Cited

U.S. PATENT DOCUMENTS

| 6,456,245 B1 * | 9/2002 | Crawford ...................... 343/702 |
| 6,469,680 B1 * | 10/2002 | Kelliher ........................ 343/893 |
| 7,427,955 B2 * | 9/2008 | Choi et al. ............. 343/700 MS |

FOREIGN PATENT DOCUMENTS

| JP | 7 321547 | 12/1995 |
| WO | WO 97/37441 | 10/1997 |
| WO | WO 01/39393 A2 | 5/2001 |
| WO | WO 02/32013 A2 | 4/2002 |
| WO | WO 02/49153 A1 | 6/2002 |

* cited by examiner

*Primary Examiner* — Hoang V Nguyen
(74) *Attorney, Agent, or Firm* — Harrington & Smith (57) ABSTRACT

It is described an antenna arrangement for transmitting and/or for receiving electromagnetic radiation. The antenna arrangement includes two antenna elements, which are adapted for transmitting and/or for receiving electromagnetic radiation of a first polarization. The antenna arrangement further includes one antenna element, which is adapted for transmitting and/or for receiving electromagnetic radiation of a second polarization being different from the first polarization. Furthermore, there is provided one coupling unit, which is adapted to couple, based on an appropriate control signal, the antenna elements selectively with one terminal of the antenna arrangement in such a manner, that the polarization direction of the antenna arrangement can be adjusted to the first polarization or to a combination of the first and the second polarization.

11 Claims, 4 Drawing Sheets

ADAPTIVE ADJUSTMENT OF AN ANTENNA ARRANGEMENT FOR EXPLOITING POLARIZATION AND/OR BEAMFORMING SEPARATION

FIELD OF INVENTION

The present invention relates to the field of telecommunication networks, wherein communication devices such as base stations and mobile end device communicate with each other based on the principles of multi antenna communication techniques including the so called Multiple Input Multiple Output (MIMO) communication technique. MIMO communication allows for establishing a Space Division Multiple Access (SDMA). In the uplink case this is often called Multi User-Single Input Multiple Output (MU-SIMO) communication. In the downlink case this is often called Multi User-Multiple Input Single Output (MU-MISO) communication.

In particular, the present invention relates to an antenna arrangement comprising a plurality of antenna elements, which can be operated in such a manner that multi antenna techniques can be applied for transmitting and/or for receiving electromagnetic radio waves signals. Further, the present invention relates to a communication device for transmitting and/or for receiving electromagnetic radiation by means of at least two antenna elements at one side of the communication link according to the principles of Multiple Input Multiple Output communications, wherein one of the communication devices is equipped with an antenna arrangement as described above. Furthermore, the present invention relates to a method for transmitting and/or for receiving electromagnetic radiation based on multi antenna communication techniques.

ART BACKGROUND

Modern communication devices increasingly use multiple antenna systems, which are often also called smart antenna systems or Multiple Input Multiple Output (MIMO) systems. MIMO communication technique is based on the idea that different replica of one and the same message, which is supposed to be transmitted, are received by different antenna elements. In a subsequent signal processing the corresponding signals from the different antenna elements are then associated with each other in an intelligent way. Thereby, the signal to noise ratio can be increased or a receiver is able to spatially separate different transmitting communication devices from each other.

In the simplified case of for instance intervisibility between a transmitting device and receiving device the separation of radio signals on the basis of their spatial signature can be generally carried out by means of two methods.

a) Beam Forming:

If the radio signals, which are supposed to be distinguished from each other, have the same polarization, beam forming can be used. Thereby, the signals, which are received from at least to different antenna elements, are combined by employing appropriate attenuation factors and/or appropriate phase shifts. This results in an increased sensitivity for receiving radio signals originating from a predetermined direction and a decreased sensitivity for receiving radio signals from another direction. This means that a spatial separation by means of beam forming can be realized by using appropriate weight and phase factors for the signals being picked up by the various antenna elements. By orienting the antenna elements in an appropriate way, radio signals originating from different communication devices and arriving from different azimuth angles can be discriminated from each other.

b) Polarization Separation:

If the radio signals, which are supposed to be distinguished from each other, have a different polarization, these signals can be picked up by means of different antenna elements, which are assigned to the different polarization directions. In case the polarizations are linear polarizations, which are preferably oriented orthogonal to each other, the corresponding radio signals can be distinguished from each other even if their difference with respect to their azimuth angle is very small.

However, in reality there is very often no intervisibility between two communication devices. Therefore, it is often not clear which of the above described methods is most suitable for providing a high quality radio data link between the communications devices. Furthermore, it is not unusual that at least one communication device is moving, such that the characteristics of the radio transmission link frequently varies in time.

There may be a need for providing an antenna arrangement, which allows for a flexible adjustment with regard to different physical conditions of a radio transmission link between different communication devices.

SUMMARY OF THE INVENTION

This need may be met by the subject matter according to the independent claims. Advantageous embodiments of the present invention are described by the dependent claims.

According to a first aspect of the invention there is provided an antenna arrangement for transmitting and/or for receiving electromagnetic radiation, in particular for transmitting and/or for receiving radio wave signals between a base station and a mobile end device. The antenna arrangement comprises (a) a first antenna element and a second antenna element, which are adapted for transmitting and/or for receiving electromagnetic radiation of a first polarization, (b) a third antenna element, which is adapted for transmitting and/or for receiving electromagnetic radiation of a second polarization being different from the first polarization, and (c) a first coupling unit, which is connected to the first antenna element, to the third antenna element and to a first terminal of the antenna arrangement, wherein the first coupling unit is adapted to couple the first terminal selectively to the first antenna element and/or to the third antenna element based on a first control signal. The first antenna element and the third antenna element are spatially separated from each other such that a first signal being assigned to the first antenna element and a third signal being assigned to the third antenna element are correlated with each other.

This first aspect of the invention is based on the idea that within one compact antenna arrangement selectively a polarization separation and/or a beamforming separation can be exploited in order to improve the quality of a radio link between a User Equipment (UE) and a base station of a telecommunication network.

Thereby, in a first operational state the first terminal is electrically connected to the first antenna element. This means, that the first antenna element and the second antenna element may be activated, which are assigned to the same polarisation. Therefore, by correlating the signals being assigned to these active antenna elements in amplitude and in phase, beam forming can be accomplished.

In a second operational state, first terminal is electrically connected to the third antenna element. This means, that the third antenna element and the second antenna element may be activated, which are assigned to different polarization directions. Therefore, by activating the third and the second antenna element in an alternating manner, polarization separation may be accomplished.

It has to be mentioned that within this application the term "terminal" is used for describing an input terminal and/or an output terminal respectively an input port and/or an output port being arranged within the antenna arrangement. Via the first terminal one single signal can be forwarded respectively transmitted within the antenna arrangement. This means that the term "terminal" must not be understood as describing an interface to another user equipment such as a mobile phone or a base station of a telecommunication network.

The described antenna arrangement may provide the advantage, that a switching between beam forming and polarization diversity can be realized with a very simple setup. Only three antenna elements and one coupling unit are necessary, wherein the coupling unit is adapted to selectively couple the first and the third antenna element with a common terminal. The second of the three antenna elements can be directly connected to further electronic components such that no second coupling unit is necessary for connecting the second antenna element. Therefore, no additional attenuation is introduced within the connection cable of the second antenna element.

It is pointed out that the term "common terminal" is used for describing an input terminal and/or an output terminal respectively an input port and/or an output port, via which one single signal can be provided to and/or extracted from the antenna arrangement. As has already been mentioned above, the term terminal must not be understood as describing an interface to another user equipment or another component of a telecommunication network.

The User Equipment may be any type of communication end device such as a cellular mobile phone, a Personal Digital Assistant (PDA), a Notebook computer and/or any other movable communication device. The base station may be for instance a so called evolution NodeB (eNodeB) of a third generation Long Term Evolution (3GPP LTE) telecommunication network.

Preferably, the first polarization and the second polarization are oriented orthogonal with respect to each other. This can be realized for instance by a linear polarization, whereas the first polarization is a horizontal polarization and the second polarization is a vertical polarization. However, also polarization directions which are oriented inclined to a horizontal axis can be employed. For instance the first polarization can be inclined by an angle of −45 degrees and the second polarization can be inclined by an angle of +45 degree with respect to a horizontal axis. Furthermore, orthogonal polarizations can also be realized by circularly or elliptically polarized radiation, wherein one radiation is a clockwise and the other radiation is an anticlockwise circularly polarized radiation.

The first and the third antenna element are arranged at a distance from each other, which allows for a signal correlation of the signals being assigned to the respective antenna elements. In case antenna elements are used, which comprise a longitudinal linear shape, the term distance refers to the spatial separation between the corresponding antenna elements perpendicular to the longitudinal direction of the antenna elements.

It has to be mentioned that the term correlation means that the signals being assigned to the various antenna elements can be combined respectively superposed with each other in such a manner that beam forming can be achieved. This means that the requested signal correlation is a prerequisite for a beam forming.

In case of transmitting an electromagnetic signal respectively electromagnetic radiation a phase correlation between the radio waves being emitted from the first and the third antenna element may have the effect, that in certain directions or locations the intensity of the emitted electromagnetic radiation is enhanced whereas in other directions or locations the intensity of the emitted electromagnetic radiation is reduced. This spatial dependent intensity pattern is based on known interference effects between coherent radiation fields having the same polarization. The same works with an effective polarization if the signals from two cross polarized antennas are combined with a certain phase factor to one or both of the two antenna elements.

In case of receiving an electromagnetic radiation signal an appropriate phase correlation between the signals of the first and the third antenna element may have the effect that the sensitivity for receiving radiation depends on the receiving direction with respect to an axis being oriented perpendicular to a connecting line between the two corresponding antenna elements. Also this effect is based on an interference effect between the signals being picked up by the antenna elements.

In both cases, the transmitting case and the receiving case, the selection of the preferred beam direction can be carried out for instance by appropriately adjusting phase shifts elements, which are inserted in the connecting lines of the antenna elements.

According to an embodiment of the invention the antenna arrangement further comprises (a) a fourth antenna element, which is adapted for transmitting and/or for receiving electromagnetic radiation of the second polarization, and (b) a second coupling unit, which is connected to the second antenna element, to the fourth antenna element and to a second terminal of the antenna arrangement, wherein the second coupling unit is adapted to couple the second terminal selectively to the second antenna element and/or to the fourth antenna element based on a second control signal. Further, the second antenna element and the fourth antenna element are spatially separated from each other such that a second signal being assigned to the second antenna element and a fourth signal being assigned to the fourth antenna element are correlated with each other.

This may provide the advantage that beam forming may be accomplished with radiation, which can be assigned to both polarization directions. In particular, if the two coupling units are switching units, beam forming can be realized with either radiation having the first polarization or with radiation having the second polarization.

According to a further embodiment of the invention at least one of the antenna elements are realized by means of a patch antenna. In this respect the term patch antenna refers to an antenna structure, wherein the antenna elements are formed on a common structure such as for instance a substrate. The substrate can be rigid or flexible. Also the coupling units can be formed on such a substrate. Further, the beam pattern might be non-omni-directional.

Preferably, the patch antenna can be operated in different polarization modes by activating at least one of the corresponding antenna elements by setting up the respective coupling unit in an appropriate manner. Preferably, the patch antenna comprises different base points for feeding the different antenna elements.

According to a further embodiment of the invention (a) the antenna arrangement is adapted for transmitting and/or for receiving electromagnetic radiation having a predefined wavelength and (b) the first and the third antenna element and/or the second and the fourth antenna element are spatially separated from each other by a distance of at least approximately half of the predefined wavelength.

This may provide the advantage that in particular when more than one antenna arrangement is used for collectively transmitting and/or receiving electromagnetic radiation, the beam forming can be accomplished in a very effective way. The high efficiency is based on the fact that in the transmitting case it is possible to focus the transmitted intensity into one preferred direction or location only. Correspondingly, in the receiving case it is possible to focus the receiving sensitivity of the antenna arrangement into one preferred direction or onto a certain set of interference locations only. This means that it is possible to have only one interference maximum and to avoid at least partially the existence of other interference maxima. In the transmitting case other interference maxima cause radiation intensity also to be directed into unwanted directions. In the receiving case other interference maxima cause the antenna arrangement also to receive significant radiation from unwanted directions.

According to a further embodiment of the invention (a) the first coupling unit is a first switching unit, which is adapted to selectively connect exactly one of the first antenna element and the third antenna element to the first terminal and/or (b) the second coupling unit is a second switching unit, which is adapted to selectively connect exactly one of the second antenna element and the fourth antenna element to the second terminal.

This means that by establishing appropriate discrete connections between the first respectively the second terminal and one of the respectively corresponding antenna elements, the antenna arrangement can be quickly toggled between two different operation modes. In a first operation mode, antenna elements are activated which are assigned to the same polarization. In this mode horizontal beam forming can be carried out by appropriately setting phase shift elements being connected within the connection cables for the different antenna elements. In a second operation mode, antenna elements are activated which are assigned to different polarizations. In this mode polarization separation can be carried out in order to increase the quality of the radio link based on the known principles of Multiple Input Multiple Output (MIMO) technique.

Using a discrete switching unit for selectively connecting one of the first and the third antenna element and for selectively connecting one of the second and the fourth antenna element, a toggling between these two operation modes can be accomplished by means of a comparatively cheap electronic device. Such a device, which can be realized with comparatively small hardware effort, may further have the advantage that it introduces only a small signal attenuation into the cables connecting the various antenna elements.

A small attenuation can be achieved in particular if the used switching unit is an electronically passive component. In this respect passive means that the switching unit does not have any impact on the electrical signals or the data that passes through it.

According to a further embodiment of the invention (a) the first coupling unit is a first distribution unit, which is adapted to couple the first terminal with the first antenna element with a first coupling factor and the first terminal with the third antenna element with a third coupling factor, and/or (b) the second coupling unit is a second distribution unit, which is adapted to couple the second terminal with the second antenna element with a second coupling factor and the second terminal with the fourth antenna element with a fourth coupling factor.

This may provide the advantage that also a continuously transition and adaptation between the above described first operation mode representing a horizontal beam forming mode and the above described second operation mode representing the polarization separation mode can be accomplished. Thereby, the various coupling factors can be selected based on appropriate control signals being applied to the first distribution unit and/or to the second distribution unit.

According to a further embodiment of the invention the antenna arrangement further comprises a third coupling unit, which is connected to the first terminal, to the second terminal and to a common terminal of the antenna arrangement. Thereby, the third coupling unit is adapted to couple the common terminal selectively to the first terminal and/or to the second terminal based on a third control signal.

This may provide the advantage that apart from various control lines being necessary for setting the described antenna arrangement in a desired operational state, the various antenna elements can be operated with a single terminal only. This means that in the transmitting case the power for driving the antenna arrangement can be supplied via a single terminal of the antenna arrangement. In the receiving case the signal being collected by the various antenna elements can be extracted from the antenna arrangement also via a single terminal. At this point it is mentioned that the third coupling unit may be adapted for operating with analog signals.

According to a further embodiment of the invention the third coupling unit comprises (a) a first electronic correcting element being electrically inserted between the first terminal and the common terminal and/or (b) a second electronic correcting element being electrically inserted between the second terminal and the common terminal.

The first and/or the second electronic correcting element may perform at least one of the following two functions: A first function is an attenuation function. This means that a signal traveling between the common terminal and the first respectively the second terminal is attenuated based on a control signal being fed to the corresponding correcting element. Thereby, the coupling between the common terminal and the first respectively the second terminal can be controlled in a continuous manner. A second function is a phase shifting function of a radio frequency signal traveling from the common terminal to the first respectively to the second terminal in the transmitting case and in the opposite direction in the receiving case. In both cases an appropriate relative phase shift between a first signal being assigned to the first terminal and a second signal being assigned to the second terminal can be generated in order to selectively direct the transmitted radiation into a desired horizontal direction (transmitting case) or adjust the spatial sensitivity for receiving radio waves such that preferably radiation arriving from a desired horizontal direction is received by the described antenna arrangement (receiving case).

At this point it is mentioned that if none of the attenuation factors of the two electronic correcting elements is infinite, a combiner element has to be used in order to avoid unwanted disturbances such as reflections of radio wave signals at the point where a first radiofrequency cable being connected to the first terminal and a second radiofrequency cable being connected to the second terminal are combined. This holds also in the case when the antenna arrangement does not comprise an electronic correction element.

Preferably, the first and/or the second correcting elements are passive electronic elements, wherein each correcting element may be controlled by an appropriate control signal.

According to a further aspect of the invention there is provided a communication device for transmitting and/or for receiving electromagnetic radiation by means of at least two antenna elements according to the principles of Multiple-input multiple-output communications. The provided device comprises (a) an antenna arrangement according to any one of the embodiments described above, (b) an amplifier, which is connected to the antenna arrangement, and (c) a processing unit, which is coupled to the amplifier.

This aspect of the invention is based on the idea that the above described antenna arrangement can be used both for an electromagnetic radiation transmitting device and for an electromagnetic radiation receiving device. This means that the antenna arrangement can be used in a telecommunication network both for the uplink channel from a User Equipment (UE) to a base station and for the downlink channel from a base station to the UE.

The described communication device may provide the advantage that there is necessary only one single amplifier in order to operate four different antenna elements. Since the antenna arrangement has to be operated with analog signals such an amplifier typically is a comparatively expensive electronic component. Therefore, by operating the whole antenna arrangement with one single amplifier only, the described communication device, which provides for a flexible radio link between two communication devices, can be manufactured at reasonable costs.

The processing unit may be a known MIMO processing unit, which, in the transmitting case, is adapted to provide appropriate signals for driving the antenna arrangement. In the receiving case, the MIMO processing unit is adapted to covert the signals captured from the antenna arrangement into appropriate data signals.

In case the communication device is a transmitting device, the antenna arrangement is connected to an output of the amplifier, which preferably is a low noise amplifier. In case the communication device is a receiving device, the antenna arrangement is connected to an input of the amplifier, which might also be a low noise amplifier.

It has to be mentioned that between the amplifier and the processing unit there may be connected an analog to digital converter. An analog to digital converter can provide a standardized interface between the processing unit operating with digital signals and the antenna arrangement operating with high frequency analog signals.

According to an embodiment of the invention the communication device further comprises a control line, which extends between the processing unit and the antenna arrangement. The control line is used for supplying at least one of (a) the first control signal, (b) the second control signal, (c) the third control signal, (d) a control signal for the first electronic correcting element and (e) a control signal for the second electronic correcting element.

The described control line may comprise a plurality of cables, wherein each cable in connected to a certain element of the antenna arrangement. However, the control line might also be realized by a common bus system, which connects preferably all control elements of the antenna arrangement by means of a common physical cable.

In has to be mentioned that of course the third control signal can only be provided to the antenna arrangement if an antenna arrangement is used, which comprises the third control coupling unit. If no third coupling unit is provided, the processing unit has to feed separately the first coupling unit and the second coupling unit.

According to a further embodiment of the invention the communication device further comprises (a) a further antenna arrangement as described above and (b) a further amplifier, which is connected to the further antenna arrangement and to the processing unit. This means that the processing unit is capable of interacting with altogether eight different antenna elements, wherein four antenna elements are adapted for transmitting and/or for receiving electromagnetic radiation of the first polarization and the four other antenna elements are adapted for transmitting and/or for receiving electromagnetic radiation of the second polarization. This means, that beam forming can be accomplished with respectively four antenna elements being assigned to the same polarization direction. This may provide the advantage that by combining four electromagnetic radiation signals, which are correlated with each other, a spatial beam forming can be carried out much more precise and much more target-oriented as compared to a combination of only two correlated electromagnetic radiation signals.

Although it is not possible to drive all eight antenna elements completely independently from each other, the described transmitting and/or receiving communication device is capable of providing a very high flexibility with respect to a combination and/or a switching between a polarization separation and/or a beamforming separation. This means that a given radio communication link between two communication devices of a telecommunication network may be exploited optimally in order to achieve an optimal quality of the link. This optimizing can be realized by means of a single processor being connected with two branches each comprising one of the above described antenna arrangements. Only passive electronic elements may be used in order to adapt respectively configure the antenna arrangement such that the antenna arrangement is able to optimally meet different conditions of radio transmission channels between a transmitter and a receiver station of a telecommunication network. Expensive components such as the amplifiers and the third coupling unit are used for different antenna elements. Therefore, the whole transmitting and/or receiving device can be manufactured in a highly cost effective way.

At this point it is mentioned that also more that two antenna arrangements each comprising preferably four antenna elements can be used. For instance four antenna arrangements each being connected to one of altogether four feeder lines can be used. Thereby up to four independent streams can be transmitted or received simultaneously.

According to a further aspect of the invention there is provided a method for transmitting and/or for receiving electromagnetic radiation, in particular for transmitting and/or for receiving radio wave signals between a base station and a mobile end device. The provided method comprises (a) transmitting and/or receiving electromagnetic radiation of a first polarization by means of a first antenna element and a second antenna element, (b) transmitting and/or receiving electromagnetic radiation of a second polarization by means of a third antenna element, the second polarization being different from the first polarization, and (c) coupling a first signal being associated with the first antenna element and a third signal being associated with the third antenna element to a first terminal by means of a first coupling unit. Thereby, the first signal and the third signal are correlated with each other.

This aspect of the invention is based on the idea that the above described antenna arrangement and/or the above described transmitting and/or receiving communication device can be effectively used for optimally exploiting a radio communication channel between two communication devices of a telecommunication network. Thereby, the principles of Multiple Input Multiple Output (MIMO) techniques may be used. Depending on the current conditions of the radio transmission link between the communication devices polarization separation and/or a beamforming separation can be exploited in order to improve the quality of a radio transmission link. Further, polarization separation and/or a beamforming separation can be exploited in order to enable spatial multiplexing, which means that independent data stream can be transmitted or received simultaneously.

According to an embodiment of the invention the method further comprises (a) transmitting and/or receiving electromagnetic radiation of the second polarization by means of a fourth antenna element, and (b) coupling a second signal being associated with the second antenna element and a fourth signal being associated with the fourth antenna element to a second terminal by means of a second coupling unit, wherein the second signal and the fourth signal are correlated with each other.

As has already mentioned above the term "terminal" is again used for describing an input terminal and/or an output terminal respectively an input port and/or an output port being arranged within the antenna arrangement. Via the second terminal one single signal can be forwarded respectively transmitted within the antenna arrangement.

This may provide the advantage that beam forming may be accomplished with radiation, which can be assigned to both polarization directions. In particular, if the two coupling units are switching units, beam forming can be realized with either radiation having the first polarization or with radiation having the second polarization.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

The illustration in the drawing is schematically. It is noted that in different figures, similar or identical elements are provided with the same reference signs or with reference signs, which are different from the corresponding reference signs only within the first digit.

Figure 1A:
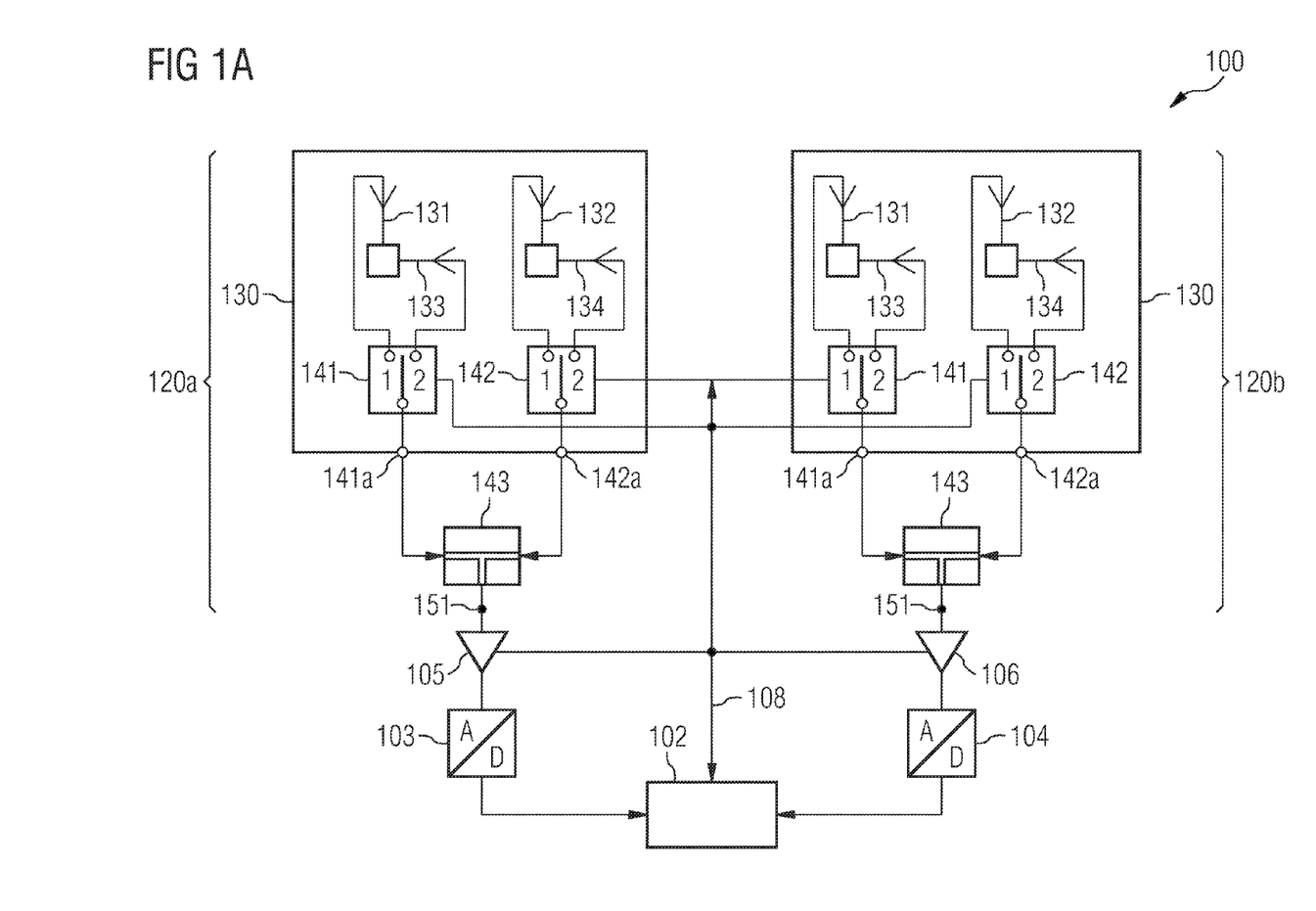
FIG. 1a shows a communication device according to a first embodiment of the present invention, wherein the communication device is adapted for receiving electromagnetic radiation.

FIG. 1a shows a communication device 100 according to a first embodiment of the present invention. The communication device 100 as described is adapted for receiving electromagnetic radiation.

The communication device 100 comprises two antenna arrangements, a first antenna arrangement 120a and a second antenna arrangement 120b. The two antenna arrangements 120a and 120b are coupled to a Multiple Input Multiple Output (MIMO) processing unit 102. Thereby, respectively one of the two antenna arrangements 120a, 120b is arranged on a branch extending from the MIMO processing unit 102.

As can be seen from FIG. 1a, each branch comprises an analog-to-digital converter 103, 104 and a low noise amplifier 105, 106. The low noise amplifier 105 is used for the amplification of analog signals being provided by the antenna arrangement 120a at a common terminal 151. The low noise amplifier 106 is used for the amplification of analog signals being provided by the antenna arrangement 120b at another common terminal 151. The analog-to-digital converters 103 and 104 are used for converting the amplified analog signals from the antenna arrangement 120a and 120b, respectively, into digital signals, which are fed into the MIMO processing unit 102.

Each antenna arrangement 120a and 120b comprises an extended antenna element 130. The extended antenna element 130 comprises four antenna elements, a first antenna element 131, a second antenna element 132, a third antenna element 133 and a fourth antenna element 134. The first antenna element 131 and the second antenna element 132 are adapted for receiving electromagnetic radiation of a first polarization. According to the embodiment described here the first polarization is a vertical polarization. The third antenna element 133 and the fourth antenna element 134 are adapted for receiving electromagnetic radiation of a second polarization. According to the embodiment described here the second polarization is a horizontal polarization.

It has to be mentioned that also other orthogonal polarization directions are possible. For instance the first polarization can be inclined by an angle of −45 degrees and the second polarization can be inclined by an angle of +45 degree with respect to a horizontal axis. Furthermore, orthogonal polarizations can be realized by circularly polarized radiation, wherein one radiation is a clockwise and the other radiation is an anticlockwise circularly polarized radiation.

The first antenna element 131 and the third antenna element 132 are spatially separated from each other such that a first signal being assigned to the first antenna element 131 and a third signal being assigned to the third antenna element 133 are correlated with each other. Further, the second antenna element 132 and the fourth antenna 134 element are spatially separated from each other such that a second signal being assigned to the second antenna element 132 and a fourth signal being assigned to the fourth antenna element 134 are correlated with each other. According to the embodiment described here, the separation between the respective antenna elements is approximately half of the wavelength of the radiation which is received form respective antenna arrangement 120a, 120b.

The separation by a distance corresponding to half of the radiation wavelength may provide the advantage that a beam forming between electromagnetic radiation having the same polarization can be accomplished in a very effective way, because it is possible to focus the receiving sensitivity of the antenna arrangement into one preferred direction only. This preferred direction corresponds to exactly one interference maximum. Other interference maxima may be avoided effectively if the separation is exactly half of the wavelength. In this context the term distance refers to the spatial separation between the corresponding antenna elements perpendicular to the longitudinal direction of the antenna elements.

The extended antenna element further comprises two coupling units 141 and 141. According to the embodiment described here the coupling units are switching units 141 and 142. The first switching unit 141 is connected to the first antenna element 131, to the third antenna element 133 and to a first terminal 141a of the antenna arrangement 120a. The first switching element 141 is adapted to selectively connect exactly one of the first antenna element 131 and the third antenna element 133 to the first terminal 141a. Correspondingly, the second switching unit 142 is connected to the second antenna element 132, to the fourth antenna element 134 and to a second terminal 142a of the antenna arrangement 120b. The second switching element 142 is adapted to selectively connect exactly one of the second antenna element 132 and the fourth antenna element 134 to the second terminal 142a. Thereby, the switching states of the switching units 141 and 142 can be controlled by the MIMO processing unit 102. Appropriate control signals are applied to the switching units 141 and 142 by means of a bus system 108 extending between the two branches of the communication device 100.

As can be seen from FIG. 1a, also the low noise amplifiers 105 and 106 are connected to the bus system 108. Therefore, the amplification factors of the low noise amplifiers 105 and 106 can also be controlled by the MIMO processing unit 102.

Each antenna arrangement 120a, 120b further comprises a third coupling unit 143. According to the embodiment illustrated in FIG. 1a the third coupling unit is a combiner 143, which combines the high frequency signal being present at the first terminal 141a and the high frequency signal at the second terminal 141b. The combined signal is fed to the low noise amplifiers 105 and 106 via the common terminals 151.

Figure 1B:
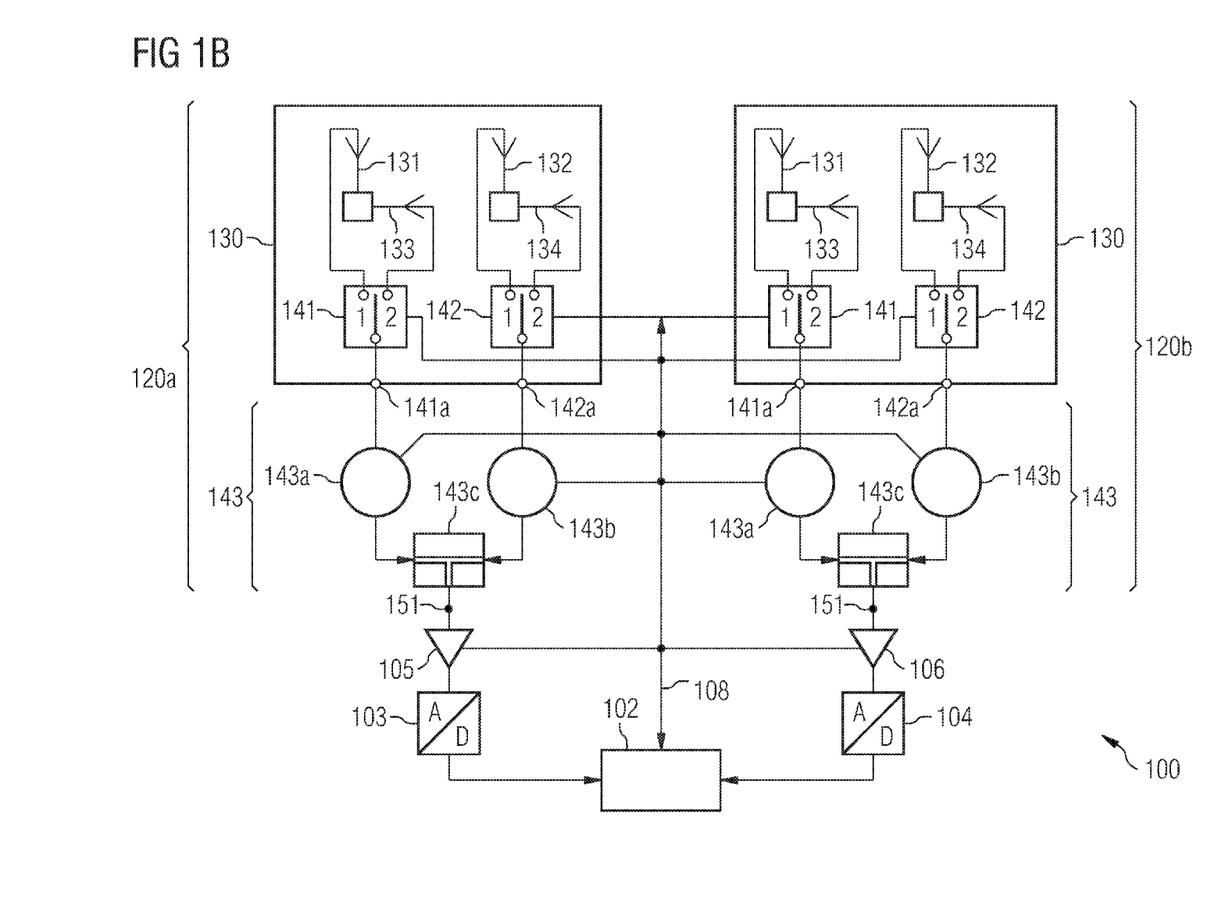
FIG. 1b shows a communication device according to a second embodiment of the present invention.

Depending on the various control signals, which are applied to the altogether four switching elements 141, 142, the communication device 100 can be adjusted in different operational states. These operational states are possible already with the simple antenna configuration, which comprises only two extended antenna elements 130 and which is illustrated in FIGS. 1a and 1b. Of course, also antenna configurations comprising more than two antenna elements 130 are possible for realizing the invention described in this patent application.

Figure 2A:
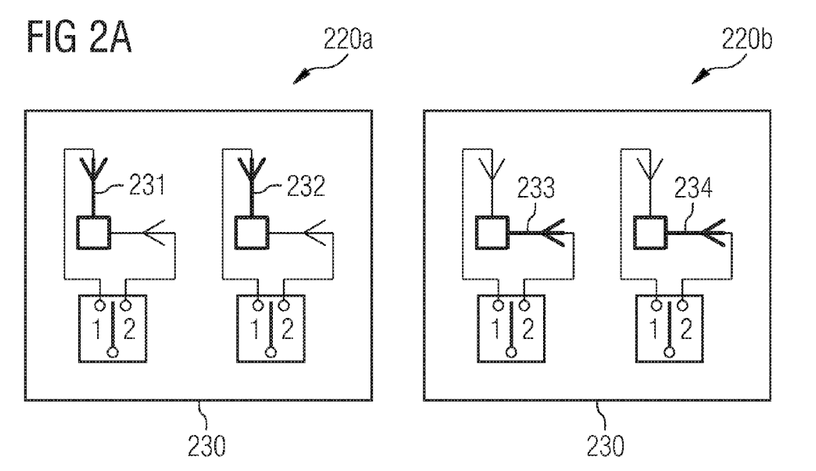
FIG. 2a illustrates a first receiving modus of two extended antenna elements, wherein polarization separation is accomplished.

In a first operational state, which is illustrated in FIG. 2a, the switching units of the extended antenna element 230 being assigned to the first antenna arrangement 220a are set such that the first antenna element 231 and the second antenna element 232 are active. The third antenna element 233 and the fourth antenna element 234 are not connected. This means, that the first antenna arrangement 220a is adapted to receive radiation having the first polarization, which according to the embodiment described here is a linear polarization being oriented in a vertical direction. By contrast thereto, the switching units of the extended antenna element 230 being assigned to the second antenna arrangement 220b are set such that the first antenna element 231 and the second antenna element 232 are not connected and the third antenna element 233 and the fourth antenna element 234 are active. This means, that the second antenna arrangement 220b is adapted to receive radiation having the second polarization, which according to the embodiment described here is a linear polarization being oriented in a horizontal direction.

In the described first operational state the two antenna arrangements are adapted to two different polarizations of electromagnetic radiation independently from each other. This provides the possibility to further process the corresponding signals, which have been picked up by the two antenna arrangements 220a and 220b, according to the known principles of MIMO communication technique. In particular, polarization separation can be effectively performed in order to improve the quality of a communication link between a not depicted transmitter and a receiver comprising the two antenna arrangements 220a and 220b.

It has to be mentioned that of course it is also possible to use additional beam forming weights in order to provide for a directionality of the electromagnetic radiation which is supposed to be received. Such beam forming weights can be realized for instance by means of passive antenna elements or a variable combiner, which will be described in more detail below with reference to FIG. 1b. Even if no beam forming weights are used, at least a coarse separation of signals originating from two antennas having a different polarization can be carried out by the polarization separation of the antenna elements 130. A fine separation of the signals originating from different antennas can be carried out in the MIMO processing unit based on known procedures of MIMO base band signal processing.

Figure 2B:
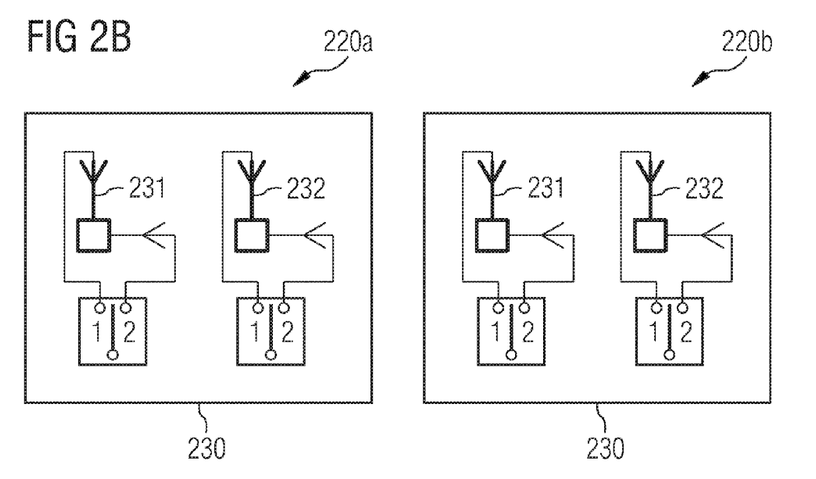
FIG. 2b illustrates a second receiving modus of two extended antenna elements, wherein beam forming is accomplished.
Figure 3A:
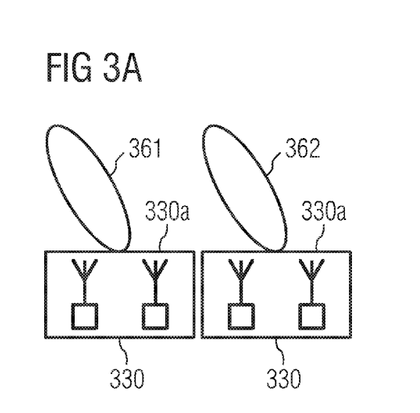
FIGS. 3a to 3d illustrate the radiation characteristic for different cooperations of radio wave signals being emitted by four antenna elements, which are assigned to the same polarization direction.
Figure 3B:
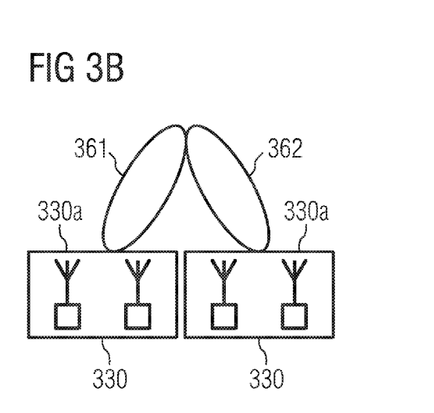
Figure 3C:
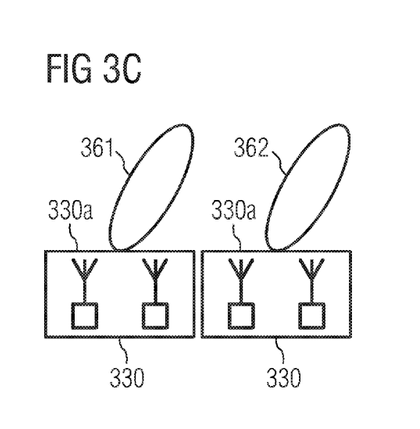
Figure 3D:
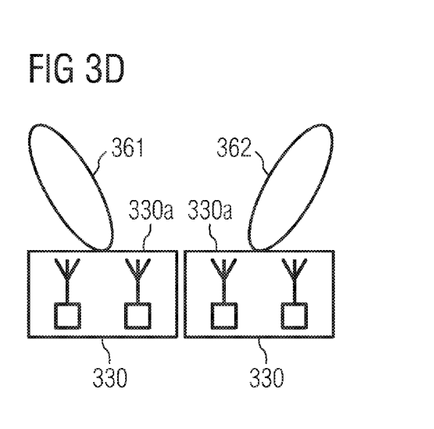

In a second operational state, which is illustrated in FIG. 2b, all the switching units are set such only the first and second antenna elements 231 and 232 are active. The third and the fourth antenna elements 233 and 234 are not connected. Therefore, only radiation components having the first polarization can be received. However, by contrast to the first operational state, now there are four antenna elements denoted with reference numbers 231 and 232, which can be used for receiving the radiation having the first polarization. By combining the altogether four signals, which have been picked up by the various active antenna elements, a beam forming can be realized. Thereby, the four signals are combined with each other with predefined phase shifts such that interference effects occur. This has the effect that electromagnetic radiation having the first polarization will be received with an increased sensitivity, if the radiation comes from a direction corresponding to an interference maximum. Accordingly, electromagnetic radiation will be received with a decreased sensitivity, if the radiation comes from another direction corresponding to an interference minimum.

In other words, by combining the signals being picked up by the various antenna elements a spatial separation by means of beam forming can be realized. Thereby, the direction with an increased sensitivity can be selected by using appropriate weight and phase factors for these signals. Further, by orienting the antenna arrangements in an appropriate way, radio signals originating from different communication devices and arriving from different azimuth angles can be discriminated from each other.

According to the embodiment described here the switching elements are passive electronic components. This may provide the advantage that they introduce a low signal attenuation only. Further, the switching status of passive switching elements can be varied very quickly such that a communication device being equipped with the two antenna arrangements 120a and 120b can be toggled in a fast and efficient way between a first receiving modus allowing for polarization separation and a second modus allowing for beam forming separation. This means, that such a communications device can be optimally adjusted in a flexible manner for different conditions of a radio communication link extending between two communication devices of a telecommunication network.

It has to be mentioned that this flexibility with respect to different receiving modes can be realized with a comparatively little hardware effort. Only relatively cheap switching units are necessary in order to allow for the described fast switching possibility.

The above described coupling of the signal being present at the first terminal 141*a* and the signal being present at the second terminal 141*b* by means of the combiner 143 (see again FIG. 1*a*) results in a spatially fixed beam, which at least in the second operational state results in a comparatively narrow angular range with respect to beam forming. This narrow angular range corresponds to a direction with a significantly increased sensitivity for receiving electromagnetic radiation having the first polarization. The direction of this fixed beam can be manipulated by means of appropriate passive antenna elements and/or by means of different combiner weights. A switchable fixed circuitry may allow for the generation of for instance two different beams for each extended antenna element. Therefore, the switchable circuitry has the functionality of a beam Fixed Beam Selector.

This means that the extended antenna element 130 acts like an antenna, which can change its polarization direction based on appropriately adjusted switching states of the switching units 141 and 142. Further, due to a non depicted switchable antenna circuitry with passive electronic components, in a beam forming modus different fixed beams can be formed.

FIGS. 3*a* to 3*d* illustrate the radiation characteristic for different fixed beam cooperations of radio wave signals being emitted by four antenna elements.

In a first cooperation (see FIG. 3*a*), the beam direction of both extended antenna elements 330 is oriented towards the left with respect to a front face 330*a* of the corresponding extended antenna elements 330. This preferred direction is illustrated by the first radiation characteristic 361 and by the second radiation characteristic 362.

In a second cooperation (see FIG. 3*b*), the beam direction of both extended antenna elements 330 is oriented towards a non depicted symmetric centerline between the two extended antenna elements 330.

In a third cooperation (see FIG. 3*c*), the beam direction of both extended antenna elements 330 is oriented towards the right with respect to the front face 330*a* of the corresponding extended antenna elements 330.

In a fourth cooperation (see FIG. 3*d*), the beam direction of the left extended antenna element 330 is oriented towards the left and the beam direction of the right extended antenna element 330 is oriented towards the right with respect to the front faces 330*a*.

FIG. 1*b* shows a communication device 100 according to a second embodiment of the present invention. The communication device 100 shown in FIG. 1*b* only differs from the communication device shown in FIG. 1*a* by the design of the third coupling unit 143. As can be seen from FIG. 1*b*, the coupling unit comprises a combiner 143*c* denoted in FIG. 1*a* with reference numeral 143. However, the coupling unit 143 further comprises two electronic correcting elements, a first electronic correcting element 143*a* and a second electronic correcting element 143*b*.

According to the embodiment described here, these electronic correcting elements are also passive electronic components which can be controlled by the MIMO processing unit 102 via the data bus 108. The electronic correcting elements have two functions: A first function is an attenuation function. This means that a signal traveling between the common terminal 151 and the first terminal 141*a* respectively the second terminal 142*a* is attenuated based on the control signal being provided by the MIMO processing unit 102. A second function is a phase shifting function of a radio frequency signal traveling from the first terminal 141*a* respectively the second terminal 142*a* to the common terminal 151. By selecting the phase shifts in an appropriate manner the spatial sensitivity for receiving radio waves can be adjusted such that preferably radiation arriving from a desired horizontal direction is received by the antenna arrangement.

It has to be mentioned that the same principles as described above for the receiving case also apply for the transmitting case. Of course, the amplifiers will work in the opposite direction i.e. a signal being provided from the analog-to-digital converter 103 and 104 will be amplified before the amplified signal is fed to the antenna arrangements 120*a* and 120*b*, respectively.

The above described communication device 100 provides for the following advantages:

1. The extended antenna elements 130 can be operated either in a polarization separation mode or in a beam forming mode. A switching between these modes can be accomplished by means of a simple polarization switching procedure carried out with the switching elements 141 and 142 and by means of a fixed beam selection carried out with the third coupling unit 143.

2. For each branch of the antenna arrangement 120*a*, 120*b* only one high frequency receiver respectively only one transmitter chain is necessary. This means that only one high frequency amplifier 105 or 106 is necessary. The polarization switches 141, 142, the electronic correcting elements 143*a*, 143*b* (see FIG. 1*b*) and the switchable combiner 143 (see FIG. 1*a*) can be integrated within the antenna arrangement 120*a*, 120*b*. In this case only one control line 108 will be necessary in order to control all these passive electronic components.

3. A fine regulation for the beam forming can be carried out in the base band by means of the MIMO processing unit, which is adapted for performing MIMO signal processing.

4. In case Orthogonal Frequency Division Multiplex (OFDM) is used the extended antenna elements can only operate in one configuration within the whole frequency band. However, a separation between different users respectively different UE can be carried out by assigning the users in different user groups and separating the user groups from each other by means of Time Division Multiplex (TDM). By adjusting the TDM time slots a corresponding telecommunication system can be adapted to a variable data load being assigned to different users respectively to different user groups.

5. It might happen that for certain users a prediction for the capability for separating the users from each other either by means of polarization separation or by means of beam forming is limited. This is the case if for instance a user comprises a high mobility within a telecommunication network. In order to enhance the user separation an artificial temporal diversity can be generated by communicating with these users at a first time by means of polarization separation and at a second time by means of beam forming. Thereby, the best operating modus for the antenna arrangements 120*a* and 120*b* can be selected and frequently adapted to changing conditions of the corresponding radio transmission link.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state: It is described an antenna arrangement 120a for transmitting and/or for receiving electromagnetic radiation. The antenna arrangement 120a comprises two antenna elements 131, 132, which are adapted for transmitting and/or for receiving electromagnetic radiation of a first polarization. The antenna arrangement 120a further comprises two further antenna elements 133, 134, which are adapted for transmitting and/or for receiving electromagnetic radiation of a second polarization being different from the first polarization. Furthermore, there are provided two coupling units 141, 142, which are adapted to couple, based on appropriate control signals, the antenna elements 131, 132, 133, 134 selectively with one of two terminals 141a, 142a of the antenna arrangement 120a in such a manner, that the polarization direction of the whole antenna arrangement 120a can be adjusted to the first polarization and/or to the sec- and polarization.

LIST OF REFERENCE SIGNS 100 communication device
102 MIMO processing unit
103 analog-to-digital converter
104 analog-to-digital converter
105 low noise amplifier
106 low noise amplifier
108 bus system
120a first antenna arrangement
120b second antenna arrangement
130 extended antenna element
131 first antenna element
132 second antenna element
133 third antenna element
134 fourth antenna element
141 first coupling unit/first switching unit/first polarization switch
141a first terminal
142 second coupling unit/second switching unit/second polarization switch
142a second terminal
143 third coupling unit/combiner
143a first electronic correcting element
143b second electronic correcting element
143c combiner
151 common terminal
220a first antenna arrangement
220b second antenna arrangement
230 extended antenna element
231 first antenna element
232 second antenna element
233 third antenna element
234 fourth antenna element
330 extended antenna element
330a front face
361 first radiation characteristic
362 second radiation characteristic

The invention claimed is:

1. Antenna arrangement for transmitting and/or for receiving electromagnetic radiation, in particular for transmitting and/or for receiving radio wave signals between a base station and a mobile end device, the antenna arrangement comprising;
 a first antenna element and a second antenna element, said first antenna element and said second antenna element being adapted for transmitting and/or for receiving electromagnetic radiation of a first polarization,
 a third antenna element, said third antenna element being adapted for transmitting and/or for receiving electromagnetic radiation of a second polarization, said second polarization being different from the first polarization, and
 a first coupling unit, said first coupling unit being connected to the first antenna element, to the third antenna element and to a first terminal of the antenna arrangement,
 wherein the first coupling unit is adapted to couple the first terminal selectively to the first antenna element and/or to the third antenna element based on a first control signal, and
 wherein the first antenna element and the third antenna element are spatially separated from each other such that a first signal being assigned to the first antenna element and a third signal being assigned to the third antenna element are correlated with each other, and
 further comprising:
 a fourth antenna element, said fourth antenna element being adapted for transmitting and/or for receiving electromagnetic radiation of the second polarization, and
 a second coupling unit, said second coupling unit being connected to the second antenna element, to the fourth antenna element and to a second terminal of the antenna arrangement,
 wherein the second coupling unit is adapted to couple the second terminal selectively to the second antenna element and/or to the fourth antenna element based on a second control signal, and
 wherein the second antenna element and the fourth antenna element are spatially separated from each other such that a second signal being assigned to the second antenna element and a fourth signal being assigned to the fourth antenna element are correlated with each other,
 wherein the connections established between the first terminal and the second terminal with their respective coupled antenna elements permit the antenna arrangement to toggle between a first operation mode and a second operation mode in order to carry out beam forming when the antenna elements are assigned to an identical polarization or polarization separation when the antenna elements are assigned to a different polarization.

2. The antenna arrangement according to claim 1, wherein at least one of the antenna elements is realized by means of a patch antenna.

3. The antenna arrangement according to claim 1, wherein the antenna arrangement is adapted for transmitting and/or for receiving electromagnetic radiation having a predefined wavelength, and the first and the third antenna element and/or the second and the fourth antenna element are spatially separated from each other by a distance of at least approximately half of the predefined wavelength.

4. The antenna arrangement according to claim 1, wherein the first coupling unit is a first switching unit, said first switching unit being adapted to selectively connect exactly one of the first antenna element and the third antenna element to the first terminal and/or
 the second coupling unit is a second switching unit, said second switching unit being adapted to selectively connect exactly one of the second antenna element and the fourth antenna element to the second terminal.

5. The antenna arrangement according to claim 1, wherein the first coupling unit is a first distribution unit, said first distribution unit being adapted to couple the first terminal with the first antenna element with a first coupling factor and the first terminal with the third antenna element with a third coupling factor, and/or the second coupling unit is a second distribution unit, said second distribution unit being adapted to couple the second terminal with the second antenna element with a second coupling factor and the second terminal with the fourth antenna element with a fourth coupling factor.

6. The antenna arrangement according to claim 1, further comprising:

a third coupling unit, said third coupling unit being connected to the first terminal, to the second terminal and to a common terminal of the antenna arrangement, wherein the third coupling unit is adapted to couple the common terminal selectively to the first terminal and/or to the second terminal based on a third control signal.

7. The antenna arrangement according to claim 6, wherein the third coupling unit comprises:

a first electronic correcting element electrically inserted between the first terminal and the common terminal, and/or a second electronic correcting element electrically inserted between the second terminal and the common terminal.

8. Communication device for transmitting and/or for receiving electromagnetic radiation by means of at least two antenna elements according to the principles of Multiple-input multiple-output communications, the device comprising:

an antenna arrangement as set forth in claim 1, an amplifier, said amplifier being connected to the antenna arrangement, and a processing unit, said processing unit being coupled to the amplifier.

9. Communication device according to claim 8, further comprising:

a control line, said control line extending between the processing unit and the antenna arrangement, wherein the control line is used for supplying at least one of the first control signal, the second control signal, the third control signal, a control signal for the first electronic correcting element, and a control signal for the second electronic correcting element.

10. Communication device according to claim 8, further comprising:

a further antenna arrangement, and a further amplifier, said further amplifier being connected to the further antenna arrangement and to the processing unit.

11. Method for transmitting and/or for receiving electromagnetic radiation, in particular for transmitting and/or for receiving radio wave signals between a base station and a mobile end device, the method comprising:

transmitting and/or receiving electromagnetic radiation of a first polarization by means of a first antenna element and a second antenna element, transmitting and/or receiving electromagnetic radiation of a second polarization by means of a third antenna element, the second polarization being different from the first polarization, and coupling a first signal associated with the first antenna element and a third signal associated with the third antenna element to a first terminal by means of a first coupling unit, wherein the first signal and the third signal are correlated with each other, and further comprising:

transmitting and/or receiving electromagnetic radiation of the second polarization by means of a fourth antenna element, and coupling a second signal associated with the second antenna element and a fourth signal associated with the fourth antenna element to a second terminal by means of a second coupling unit, wherein the second signal and the fourth signal are correlated with each other, wherein the connections established between the first terminal and the second terminal with their respective coupled antenna elements permit the antenna arrangement to toggle between a first operation mode and a second operation mode in order to carry out beam forming when the antenna elements are assigned to an identical polarization or polarization separation when the antenna elements are assigned to a different polarization.

* * * * *